United States Patent
Kulkarni et al.

(10) Patent No.: US 10,689,004 B1
(45) Date of Patent: Jun. 23, 2020

(54) MONITORING SYSTEM FOR DETECTING DEGRADATION OF A PROPULSION SUBSYSTEM

(71) Applicant: General Electric Company, Schenectady, NY (US)

(72) Inventors: Raghav Shrikant Kulkarni, Bangalore (IN); Cesar Domingos, Contagem (BR); Vinaykanth V Mudiam, Lawrence Park, PA (US); Neil Xavier Blythe, Erie, PA (US); Shawn Gallagher, Erie, PA (US); Daniel Loringer, Erie, PA (US); Pedro Lopes, Contagem (BR); Vinayak Tilak, Hyderabad (IN); James Robert Mischler, Lawrence Park, PA (US); Patricia Sue Lacy, Lawrence Park, PA (US); Michael Majewski, Erie, PA (US); Pradheepram Ottikkutti, Lawrence Park, PA (US)

(73) Assignee: GE GLOBAL SOURCING LLC, Norwalk, CT (US)

(*) Notice: Subject to any disclaimer, the term of this patent is extended or adjusted under 35 U.S.C. 154(b) by 0 days.

(21) Appl. No.: 15/965,405

(22) Filed: Apr. 27, 2018

Related U.S. Application Data

(60) Provisional application No. 62/491,765, filed on Apr. 28, 2017.

(51) Int. Cl.
*B60W 50/00* (2006.01)
*G07C 5/08* (2006.01)
(Continued)

(52) U.S. Cl.
CPC ..... *B60W 50/0098* (2013.01); *G01C 21/3453* (2013.01); *G05D 1/0088* (2013.01);
(Continued)

(58) Field of Classification Search
CPC ......... B60W 50/0098; B60W 2510/06; B60W 2510/30; G05D 1/0274; G05D 1/0088;
(Continued)

(56) References Cited

U.S. PATENT DOCUMENTS

| 6,504,474 B1 | 1/2003 | Goodnight et al. |
| 2006/0095179 A1 | 5/2006 | Schneider et al. |

(Continued)

FOREIGN PATENT DOCUMENTS

WO WO-2016149064 A1 * 9/2016 ............... B61K 9/08

OTHER PUBLICATIONS

International Search Report, International; Application No. PCT/US2018/030231; Aug. 20, 2018; (8) pages.
(Continued)

*Primary Examiner* — Rodney A Butler
(74) *Attorney, Agent, or Firm* — Christopher R. Carroll; The Small Patent Law Group LLC

(57) ABSTRACT

A system detects a parameter and generates a first trip plan to automatically control the vehicle according to a first trip plan. A controller is connected to a sensor and configured to receive the parameter. The controller is configured to generate a new trip plan or modify the first trip plan into a modified trip plan based on at least one of a cumulative damage or an end of life. A new trip plan or the modified trip plan is configured, during operation of the vehicle according to the new trip plan or the modified trip plan, for at least one of an adjustment in velocity or avoiding one or more operating conditions of the vehicle, relative to the first trip plan.

20 Claims, 7 Drawing Sheets

(51) Int. Cl.
  *G05D 1/00*   (2006.01)
  *G01C 21/34*  (2006.01)
  *G05D 1/02*   (2006.01)

(52) U.S. Cl.
  CPC ......... *G05D 1/0274* (2013.01); *G07C 5/0808* (2013.01); *G07C 5/0825* (2013.01); *B60W 2510/06* (2013.01); *B60W 2510/30* (2013.01); *G05D 2201/0213* (2013.01)

(58) Field of Classification Search
  CPC ........ G05D 2201/0213; G01C 21/3453; G07C 5/0825; G07C 5/0808
  See application file for complete search history.

(56) References Cited

U.S. PATENT DOCUMENTS

| | | | |
|---|---|---|---|
| 2015/0006007 A1 | 1/2015 | Kitahata et al. | |
| 2016/0035155 A1* | 2/2016 | Rice | G07C 5/0808 701/51 |
| 2017/0158130 A1* | 6/2017 | Patil | B60Q 11/005 |
| 2017/0367268 A1* | 12/2017 | Lang | A01F 15/042 |

OTHER PUBLICATIONS

Written Opinion of the International Searching Authority, Internationa; Appliction No. PCT/US2018/030231; Aug. 20, 2018; (10) pages.
International Preliminary Report on Patentability for International Application No. PCT/US2018/030231; Nov. 7, 2019; (12) pages.

\* cited by examiner

MONITORING SYSTEM FOR DETECTING DEGRADATION OF A PROPULSION SUBSYSTEM

CROSS-REFERENCE TO RELATED APPLICATIONS

This application claims priority to U.S. Provisional Application No. 62/491,765, filed 28 Apr. 2017, the entire disclosure of which is incorporated herein by reference in its entirety.

FIELD

Embodiments of the subject matter disclosed herein relate to detecting and/or predicting the degradation of a vehicle propulsion subsystem.

BACKGROUND

Various vehicle systems include a propulsion subsystem. The propulsion subsystem may include engines, motors, pumps, turbochargers, oil filters, alternators, radiators, and/or other devices or machines that operate to propel the vehicle system. Operation of the propulsion subsystem over time can degrade components of the propulsion subsystem, which may lead to failure of the propulsion subsystem. The propulsion subsystem can be inspected to identify and/or repair damaged components based on a conventional or fixed maintenance schedule.

These types of maintenance schedules, however, use conservative or fixed time schedules. The conservative time schedule can be based on a set of assumptions on the use and/or operation of the vehicle system to estimate when the components of the propulsion system may fail. Based on the set of assumptions, the conventional maintenance schedule may not be based on the usage and/or operation of the vehicle system, and can incorrectly predict a shortened life cycle of the components of the propulsion subsystem. This conventional maintenance schedule can thereby increase costs of inspections for components that are not at end of life and/or do not require replacement. Additionally, due to the frequent inspections, the vehicle systems may be taken out of service when inspections are not needed. This can decrease the efficiency at which a transportation network of vehicle systems operate. Additionally, during inspection of the components, contamination of components and/or damage to components may occur, thereby decreasing the efficiencies of the vehicle systems.

On the other hand, significant usage of the components and/or systems can result in the components degrading faster than expected. This can result in the components becoming irreparably damaged prior to the next scheduled inspection.

BRIEF DESCRIPTION

In an embodiment, a system (e.g., monitoring system) is provided. The system includes a sensor configured to detect a parameter of a propulsion subsystem of a vehicle, and one or more controllers. At least one of the controllers is configured to generate a first trip plan and to automatically control the vehicle according to the first trip plan. At least one of the controllers is operatively connected to the sensor and is configured to receive the parameter of the propulsion subsystem. The one or more controllers are configured to calculate a cumulative damage of a component of the propulsion subsystem based on the parameter, and to determine an end of life of the component based on the cumulative damage. At least one of the controllers is configured to generate a new trip plan or modify the first trip plan into a modified trip plan based on at least one of the cumulative damage or the end of life that is determined. The trip plans (e.g., the first, new, and/or modified trip plans) dictate operational settings of the vehicle at different locations, distances along routes, or times. For example, the trip plans can dictate the throttle settings, speeds, braking efforts, or the like, that the vehicle system is to implement for travel along routes. In one embodiment, the trip plans can be created to reduce the fuel consumed and/or emissions generated by the vehicle system relative to the vehicle traveling according to other, different trip plans. The new or modified trip plan or the modified trip plan can adjust the velocity of the vehicle system (relative to the first trip plan) and/or avoid one or more operating conditions of the vehicle such that operation of the vehicle according to the new or modified trip plan results in less wear or use of the component when compared to operation of the vehicle according to the first trip plan.

In an embodiment, a method is provided. The method includes receiving, from one or more sensors, one or more parameters measured from a propulsion subsystem of a vehicle. The method includes calculating a cumulative damage of a component of the propulsion subsystem based on the parameter(s). The method includes generating a first trip plan and automatically controlling the vehicle according to the first trip plan. The method includes determining an end of life of the component relative to (or based on) the cumulative damage. The method includes generating a new trip plan or modifying the first trip plan into a modified trip plan based on at least one of the cumulative damage or the end of life. The new or modified trip plan or the modified trip plan can adjust the velocity of the vehicle system (relative to the first trip plan) and/or avoid one or more operating conditions of the vehicle such that operation of the vehicle according to the new or modified trip plan results in less wear or use of the component when compared to operation of the vehicle according to the first trip plan.

BRIEF DESCRIPTION OF THE DRAWINGS

The present inventive subject matter will be better understood from reading the following description of non-limiting embodiments, with reference to the attached drawings, in which.

DETAILED DESCRIPTION

Figure 1:
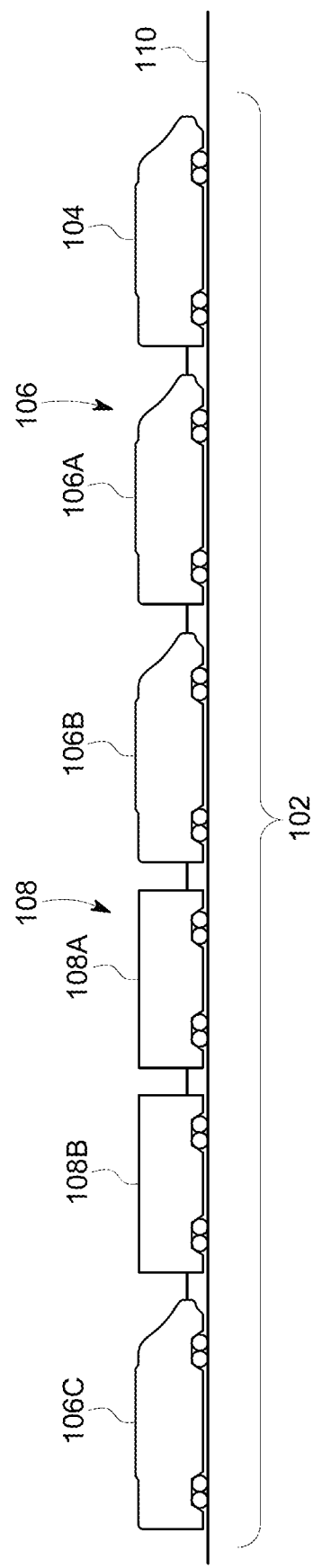
FIG. 1 illustrates a vehicle system, in accordance with an embodiment.

Various embodiments described herein relate to detecting degradation of a vehicle propulsion subsystem. The degradation may be detected by a monitoring system that is configured to analyze a propulsion subsystem of a vehicle system. The vehicle system may include a single or plural propulsion-generating vehicles. Each of the propulsion-generating vehicles may include a propulsion subsystem. The propulsion subsystem may include components such as one or more engines, motors, alternators, generators, brakes, batteries, turbines, turbochargers, oil filters (e.g., centrifuge filters), and/or the like, that operate to propel the vehicle system. The vehicle system can include one or more locomotives or other rail vehicles, automobiles, marine vessels, mining vehicles or other off-highway vehicles (e.g., vehicles that are not designed for travel on public roadways and/or that are not legally permitted for travel on public roadways), airplanes, or the like.

The monitoring system may be configured to monitor one or more components of the propulsion subsystem, such as but not limited to, turbochargers. For example, the monitoring system may be configured to repeatedly receive parameters from a sensor that measures aspects of the operation of the turbocharger. Based on the sensor parameters, the monitoring system determines the number and/or magnitude of high-stress events of the turbocharger. For example, the high-stress events may be detected when a speed of the vehicle propulsion subsystem exceeds a designated, non-zero threshold. In another example, the high-stress events may be detected when a throttle setting of the vehicle propulsion subsystem exceeds a designated threshold, such as a throttle that is exceeding a mechanical specification of the vehicle propulsion subsystem (e.g., redlining the throttle settings of the vehicle propulsion subsystem). In another example, the high-stress events may be detected when an operating temperature of the vehicle propulsion subsystem exceeds an upper threshold, such as exceeding a mechanical specification of the vehicle propulsion subsystem. The monitoring system can adjust or request an adjustment to a trip plan based on the cumulative damage of the component.

The high-stress events are identified by the monitoring system to determine the cumulative damage, performance, and/or remaining useful life of components of the turbocharger. For example, the monitoring system may examine the parameters received from the sensors to identify a throttle setting, temperature, operating speed, or the like, of the propulsion subsystem. The cumulative damage can be calculated based on these parameters and prior information of materials and processes used in the design and/or manufacture of the propulsion system and components of the propulsion system (e.g., the turbocharger). The monitoring system can generate a digital model or digital twin of the turbocharger based on the parameters and/or prior information.

The digital twin can be an electronic representation of the current state of the component that is based on previous duty cycles and/or conditions in which the component operated. This digital twin can be examined by simulating future operation of the component at designated or planned operational settings and/or in designated or forecasted conditions. This simulation can reveal further damage or other deterioration of the component without actually subjecting the component to the future operation that is simulated. This can allow for increased damage and/or deterioration of the component to be predicted. For example, based on the digital twin, the monitoring system may be configured to predict when a component of the turbocharger is likely to fail, likely to reach end of life (e.g., during an upcoming planned or scheduled mission or trip), likely to require maintenance or servicing to avoid failure, and/or the like. Responsive to the monitoring system determining that a component of the turbocharger is likely to fail or is close to the end of life, the monitoring system may automatically schedule repair and/or reserve time at an overhaul facility to maintain, service, or repair the component prior to the failure of the component.

Optionally, responsive to the monitoring system determining that a component of the turbocharger is likely to fail or is close to the end of life, the monitoring system may change or request that an operational plan of the component (or a system that includes the component) be modified. For example, a vehicle may be scheduled or expected to travel along one or more routes in an upcoming trip according to a trip plan. The trip plan may designate or dictate operational settings of the vehicle at different locations, distances along the route(s), and/or times during the upcoming trip. These operational settings can include throttle settings, brake settings, speeds, or the like. The monitoring system can change or request that the trip plan be modified responsive to examining cumulative or prior damage, simulating potential additional damage to the component due to operating according to the trip plan, and determining that the component is likely to fail (e.g., has a greater than 50% chance of failure) before completion of the trip, is likely to require servicing before completion of the trip, and/or will have a remaining service or useful life that will decrease below a threshold.

During or responsive to detection of an overstress event, the monitoring system may be configured to mitigate or reduce further damage to the component. For example, the monitoring system may adjust or request adjustment to the trip plan, such as adjusting a throttle, an arrival time, breaking, and/or the like. The monitoring system may adjust the trip plan to extend the end of life of the component until an end of the trip plan. For example, the monitoring system may modify and/or form a new trip plan by reducing the throttle, breaking, schedule of the trip plan. Alternatively, the monitoring system can request that an energy management system modify and/or form a new plan. Optionally, the monitoring system automatically identifies the end of life of the component and initiates maintenance or servicing of the component at time that is earlier than a next scheduled maintenance or repair.

Based on the parameters output by the sensor, the monitoring system may be configured to predict a remaining life of the component and/or operation of the component (e.g., the turbocharger). The monitoring system is configured to manage operation of the component based on the remaining life of the component to fully use up the life of the component of the turbocharger prior to maintenance and/or schedule overhaul of the vehicle, or to delay when servicing, repair, or maintenance of the components would otherwise be needed.

The monitoring system may be configured to automatically adjust or request adjustment to a schedule and/or a moving velocity of the vehicle system to extend a life of the component during operation of the vehicle system. For example, during operation of the vehicle system, the monitoring system may determine that the failure, the end of life, and/or the like, of the component if likely to occur. The monitoring system may automatically schedule the maintenance and/or a servicing of the component, responsive to predicting that the component is likely to reach the end of life. Optionally, the monitoring system may adjust or request adjustment to a throttle, breaking, schedule, and/or the like, of a trip plan based on a prediction that the component is likely to reach the end of life.

The monitoring system may change distribution of a load across different propulsion-generating vehicles within the vehicle system to reduce damage to a component or to prolong when servicing or replacement of the component is needed. For example, the monitoring system may change operational settings of one or more propulsion-generating vehicles in a vehicle system having multiple propulsion-generating vehicles to change a distribution of tractive efforts, duty cycles, or the like, of propulsion systems of the vehicles. This re-distribution of operational settings can change the operational loads on different vehicles, and can slow down deterioration or damage to one or more components of at least one of the vehicles. This can delay when servicing or maintenance is needed, or can extend the useful life, of one or more components of the vehicles.

One or more embodiments of the monitoring system examine rotor speed information to detect degrading functions and/or a need to service a centrifuge lube oil filter of the propulsion-generating vehicle. The degrading functions may represent buildup on the oil filter, such as soot cake, mass, degradation of oil passing through the oil filter, particles within the oil filter, and/or the like. The centrifuge lube oil filters are installed in engines to clean the lubrication oil. A rotor speed signal may be obtained from an engine control system and, together with other collected information (e.g., lube oil pressure, lube oil temperature, engine speed), the monitoring system can assess the need for service and/or inspection from a particular centrifuge filter operating in the propulsion-generating vehicle. The monitoring system may display indicators to notify the operator to change the oil filter, replace the oil filter, perform maintenance on the oil filter, and/or the like. For example, the display may present diagnostic messages/codes to alert an operator of a corrective action (e.g., a need to service the oil filter). One or more controllers of the vehicle system may restrict engine operation in response to detection of a critical issue (e.g., the oil filter stops functioning).

The monitoring system may shut down the propulsion subsystem to reduce oil pressure on the oil filter. The shut down of the propulsion subsystem also may stop a rotor speed of the propulsion subsystem. The monitoring system can measure the rotor speed signal and record an amount of time elapsed from shut down until the speed of the rotor speed is reduced. This amount of time can indicate the health of the oil filter. For example, longer times for the rotor speed to reduce to a designated speed (or become stationary) can indicate a clogged filter that needs to be replaced, while shorter times can indicate that the filter has less clogging. Alternatively, longer times for the rotor speed to reduce to the designated speed can indicate less clogging, while shorter times can indicate that the filter is clogged. The monitoring system may resolve problems such as determining when an oil filter is full of debris (e.g., soot cake). The monitoring system may advise the operator of the vehicle system of the oil filter, such as for of debris (e.g., soot cake). The rotor speed information may indicate operational capture issues with the rotor speed that may require corrective actions. For example, if the rotor is not rotating or is rotating more slowly, this lack of speed or reduced speed can indicate that the oil filter is clogged or is otherwise compromised).

One or more embodiments of the monitoring system can detect malfunctions in the centrifuge oil filter without having to open the filter for inspection, without having to open a housing in which the filter is disposed for inspection, and/or without stopping operation of the propulsion system that includes the oil filter. The monitoring system can detect when the filter needs servicing based on the monitored rotor speed, which is impacted by the amount of debris accumulated in the cylinder wall. For example, the monitoring system can calculate different profiles that represent a temporally delay from shut down or deactivation of the propulsion system and the reduction of the rotor speed to a designated speed (e.g., zero speed or another speed). The monitoring system may compare the profiles to identify the status of the oil filter, as described below.

The operator and/or the maintainer can be advised by the monitoring system via a display that presents information such as diagnostic messages, codes, or the like. This information can be presented to alert the operator and/or maintainer of a required corrective action. The monitoring system may restrict the operation of the engine in the event that a critical issue is detected. For example, responsive to detecting the second and/or third profiles of the oil filter, the monitoring system may automatically adjust the trip plan. In another example, responsive to detecting the second and/or third profiles, the monitoring system may automatically schedule the inspection, maintenance, or replacement of the oil filter.

At least one technical effect of embodiments described herein includes real-time tracking of the remaining useful life or service life of components of a propulsion subsystem by identifying a cumulative damage model. At least one other technical effect includes the ability to track the cumulative damage and remaining useful life of individual components of the propulsion subsystem. At least one other technical effect includes the ability to schedule the replacement of components within the propulsion subsystem when the components approach the end of useful lives of the components. At least one other technical effect includes a reduction in unplanned maintenance, lost revenue, or disruption of service associated with the unexpected failure of a component. At least one other technical effect includes the ability to replace components during service and/or overhaul events which have achieved full useful life. At least one other technical effect includes the ability to match components with similar remaining useful life during a maintenance or overhaul event to minimize the number of service events required. At least one other technical effect includes a lower life-cycle cost by extending the useful life of components of the propulsion subsystem. At least one other technical effect includes avoiding unwarranted service interruptions of propulsion subsystems in the field. At least one other technical effect includes improved reliability of a propulsion subsystem. At least one other technical effect includes reduced risk to operating personnel of the vehicle system. At least one other technical effect includes a reduction of fuel consumption and improves the operations of the vehicle system through fuel savings and proper handling. At least one other technical effect includes increasing the cooling and lubrication system of the propulsion subsystem by optimizing the maintenance of the oil filter. At least one other technical effect includes identifying when the oil filter needs to be cleaned without needing to open the filter.

A more particular description of the inventive subject matter briefly described above will be rendered by reference to specific embodiments thereof that are illustrated in the appended drawings. The inventive subject matter will be described and explained with the understanding that these drawings depict only typical embodiments of the inventive subject matter and are not, therefore, to be considered to be limiting of its scope. Wherever possible, the same reference numerals used throughout the drawings refer to the same or like parts. The various embodiments are not limited to the arrangements and instrumentality shown in the drawings.

FIG. 1 illustrates one embodiment of a vehicle system 102. The illustrated vehicle system 102 includes one or more propulsion-generating vehicles 104, 106 (e.g., vehicles 104, 106A, 106B, 106C) and/or one or more non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other. For example, the vehicles 104, 106, 108 may be logically coupled by the vehicles communicating with each other to coordinate vehicle movements with each other so that the vehicles 104, 106, 108 travel together along the route 110 without being mechanically coupled to each other. The vehicle system 102 can be formed from a single vehicle or multiple vehicles.

The propulsion-generating vehicles 104, 106 are shown as locomotives, the non-propulsion-generating vehicles 108 are shown as rail cars, and the vehicle system 102 is shown as a train in the illustrated embodiment. Optionally, the vehicle system 102 may represent other vehicles. For example, the vehicle system 102 may represent one or more automobiles (e.g., a car, a semi-truck), one or more airplanes, one or more marine vessels, one or more mining vehicles, one or more other off-highway vehicles (e.g., vehicles that are not designated for and/or are not legally permitted to travel on public roadways), or the like. The number and arrangement of the vehicles 104, 106, 108 in the vehicle system 102 are provided as one example and are not intended as limitations on all embodiments of the subject matter described herein.

Optionally, groups of one or more adjacent or neighboring propulsion-generating vehicles 104 and/or 106 may be referred to as a vehicle consist. For example, the vehicles 104, 106A, 106B may be referred to as a first vehicle consists of the vehicle system 102 and the vehicle 106C referred to as a second vehicle consists of the vehicle system 102. Alternatively, the vehicle consists may be defined as the vehicles that are adjacent or neighboring to each other, such as a vehicle consist defined by the vehicles 104, 106A, 106B, 108A, 108B, 106C.

Figure 2:
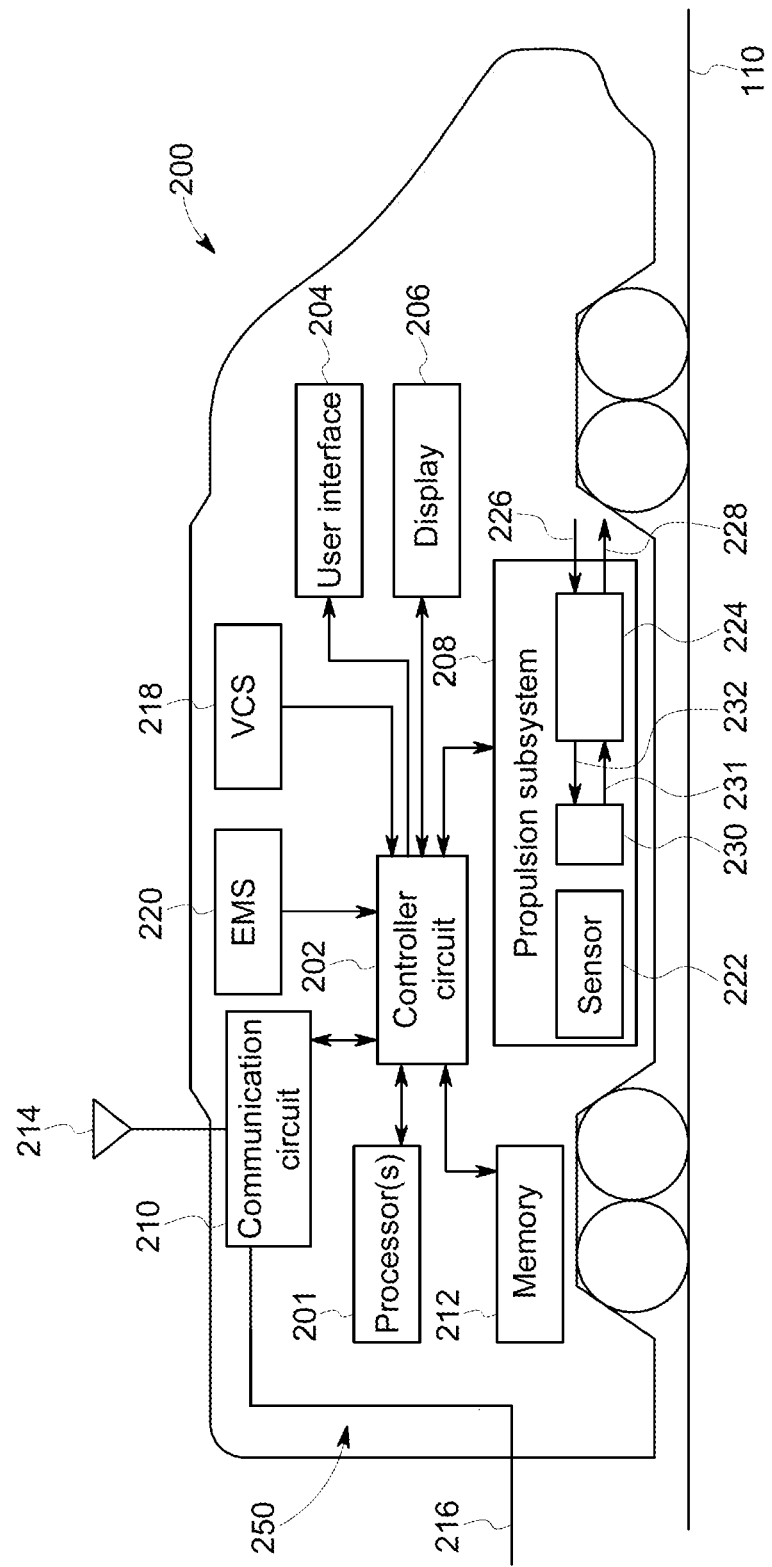
FIG. 2 is a schematic diagram of a monitoring system within a propulsion-generating vehicle, in accordance with an embodiment.

FIG. 2 is a schematic diagram of a propulsion-generating vehicle 200 in accordance with one embodiment. The vehicle 200 may represent one or more of the vehicles 104, 106 shown in FIG. 1. The vehicle 200 includes a monitoring system 250 that monitors operation of components of the vehicle 200. A controller circuit 202 controls operations of the vehicle 200. The monitoring system 250 and/or controller circuit 202 may include or represent one or more hardware circuits or circuitry that include, are connected with, or that both include and are connected with one or more processors 201, one or more controllers, or other hardware logic-based devices.

The controller circuit 202 may be connected with a communication circuit 210. The communication circuit 210 may represent hardware and/or software that is used to communicate with other vehicles (e.g., the vehicles 104-108) within the vehicle system 102, dispatch stations, remote system, maintenance systems, and/or the like. For example, the communication circuit 210 may include a transceiver and/or associated circuitry (e.g., an antenna 214) for wirelessly communicating (e.g., communicating and/or receiving) linking messages, command messages, linking confirmation messages, reply messages, retry messages, repeat messages, status messages, and/or the like. Optionally, the communication circuit 210 includes circuitry for communicating the messages over a wired connection 216, such as a multiple unit (MU) line of the vehicle system 102, catenary or third rail of an electrically powered vehicle, or another conductive pathway between or among the propulsion-generating vehicles 104, 106 in the vehicle system 102.

A memory 212 may be used for storing data (e.g., one or more parameters) associated with one or more sensors 222 (e.g., operational threshold values, location information), component specification information, firmware or software corresponding to, for example, programmed instructions for one or more components in the propulsion-generating vehicle 200 (e.g., the controller circuit 202, a propulsion subsystem 208, an energy management system 220, a vehicle control subsystem 218, and/or the like). For example, the memory 212 may store parameters acquired from the one or more sensors 222, such as the rotor speed information received from the propulsion subsystem 208. The memory 212 may be a tangible and non-transitory computer readable medium such as flash memory, RAM, ROM, EEPROM, and/or the like.

The controller circuit 202 is connected to a user interface 204 and the display 206. The controller circuit 202 can receive manual input from an operator of the propulsion-generating vehicle 200 through the user interface 204, such as a keyboard, touchscreen, electronic mouse, microphone, and/or the like. For example, the controller circuit 202 can receive manually input changes to the tractive effort (e.g., notch settings), braking effort, speed, power output, and/or the like, from the user interface 204. Optionally, the notch settings may refer to a throttle of the propulsion-generating vehicle 200.

A display 206 may include one or more liquid crystal displays (e.g., a light emitting diode (LED) backlight), organic light emitting diode (OLED) displays, plasma displays, CRT displays, and/or the like. For example, the controller circuit 202 can present the status and/or details of the vehicle system 102, faults/alarms generated by the controller circuit 202 (e.g., diagnostic messages/codes), identities and statuses of the remote vehicle systems traversing along the route 110, contents of one or more command messages, and/or the like. Optionally, the display 204 may be a touchscreen display, which includes at least a portion of the user interface 204.

A vehicle control system (VCS) 218 can include hardware circuits or circuitry that include and/or are connected with one or more processors to the controller circuit 202. The VCS 218 may control and/or limit movement of the propulsion-generating vehicle 200 and/or the vehicle system 102 that includes the vehicle 200 based on one or more limitations. For example, the VCS 218 may prevent the vehicle 200 and/or vehicle system 102 from entering into a restricted area, can prevent the vehicle 200 and/or vehicle system 102 from exiting a designated area, can prevent the vehicle 200 and/or vehicle system 102 from traveling at a speed that exceeds an upper speed limit, can prevent the vehicle 200 and/or vehicle system 102 from traveling at a speed that is less than a lower speed limit, and/or the like. In one embodiment, the VCS 218 includes and/or represents a positive train control system. The VCS 218 may be programmed and/or otherwise, have access to the vehicle identifiers of the vehicles included in the vehicle system 102 stored in the memory 212. For example, the VCS 218 may store right access to the vehicle identifiers so that the VCS 218 can determine how to control or limit control of the vehicle 200 and/or the vehicle system 102 that includes the vehicle 200 to prevent the vehicle 200 and/or vehicle system 102 from violating one or more of the limits.

An energy management system 220 can include hardware circuits or circuitry that include and/or are connected with one or more processors to the controller circuit 202. The energy management system 220 can create and/or update the trip plans described herein. The controller circuit 202 receives the parameters from the sensors 222 during the trip plan. Based on the parameters received from the sensors 222, the controller circuit 202 may instruct the energy management system 220 to revise and/or modify the trip plan.

The energy management system 220 is configured to generate trip plans for the vehicle 200 and/or the vehicle system 102. For example, the trip plan may represent a notch setting (e.g., a throttle), braking, a schedule, and/or the like of the vehicle system 102 to arrive at an end location. The trip plan may designate operational settings (e.g., notch settings and/or throttle) of the vehicle 200 and/or the vehicle system 102 as a function of time, location and/or distance along a route for a trip plan. Traveling according to the operational settings designated by the trip plan can reduce fuel consumed and/or emissions generated by the vehicle 200 and/or the vehicle system 102 relative to the vehicle 200 and/or vehicle system 102 traveling according to other operational settings that are not designated by the trip plan. The energy management system 220 may be programmed with or otherwise have access to the vehicle identifiers of the vehicles 104-108 included in the vehicle system 102. The identities of the vehicles 104-108 in the vehicle system 102 may be known to the energy management system 220 so that the energy management system 220 can determine what operational settings to designate for the trip plan to achieve a goal of reducing fuel consumed and/or emissions generated by the consists during the trip plan.

The controller circuit 202 is operably and/or conductively coupled to a propulsion subsystem 208. The propulsion subsystem 208 provides tractive effort and/or braking effort for the propulsion-generating vehicle 200. The controller circuit 202 can generate control signals autonomously (e.g., from the energy management system 220) and/or based on manual input that is used to direct operations of the propulsion subsystem 208. The propulsion subsystem 208 may include or represent one or more engines 230, motors, alternators, generators, turbochargers, brakes, batteries, turbines, and/or the like, that operate to propel the propulsion-generating vehicle 200 under the manual or autonomous control that is implemented by the controller circuit 202.

The energy management system may adjust the trip plan by adjusting the braking and/or throttle of the vehicle system 102. For example, one or more sensors 222 may identify cumulative damage of the propulsion subsystem 208. Based on the cumulative damage of the propulsion subsystem 208, the controller circuit 202 may adjust the notch settings (e.g., throttle) and/or schedule of the trip plan to reduce the damage of the cumulative damage of the component. The controller circuit 202 may adjust an arrival time, fuel usage, and/or a component repair cost based on the adjustment of the throttle and/or braking. The controller circuit 202 may adjust the throttle, braking, arriving schedule, and/or the like to reduce damage to the component. For example, the controller circuit 202 may reduce the throttle, braking, and/or arrive schedule to reduce damage to the component. Optionally, the controller circuit 202 may reduce the braking of the propulsion-generating vehicle 200. For example, the controller circuit 202 reduces an amount of braking of a portion-generating vehicle 200 during a steep grade, a curve, and/or the like along the route 110.

The propulsion subsystem 208 is shown having a turbocharger 224. The turbocharger 224 is coupled to an exhaust passage 228 and an intake passage 226. For example, the intake passage 226 receives ambient air from outside the vehicle 200 and is received by the engine 230 via an intake passage 232 interposed between the turbocharger 224 and the engine 230. Exhaust gas resulting from combustion in the engine 230 is supplied to the exhaust passage 231 and is expelled along the exhaust passage 228 by the turbocharger 224. The turbocharger 224 is configured to increase air charge of ambient air drawn into the intake passage 226 to provide greater charge density during combustion to increase power output and/or engine-operating efficiency of the engine 230.

Figure 3:
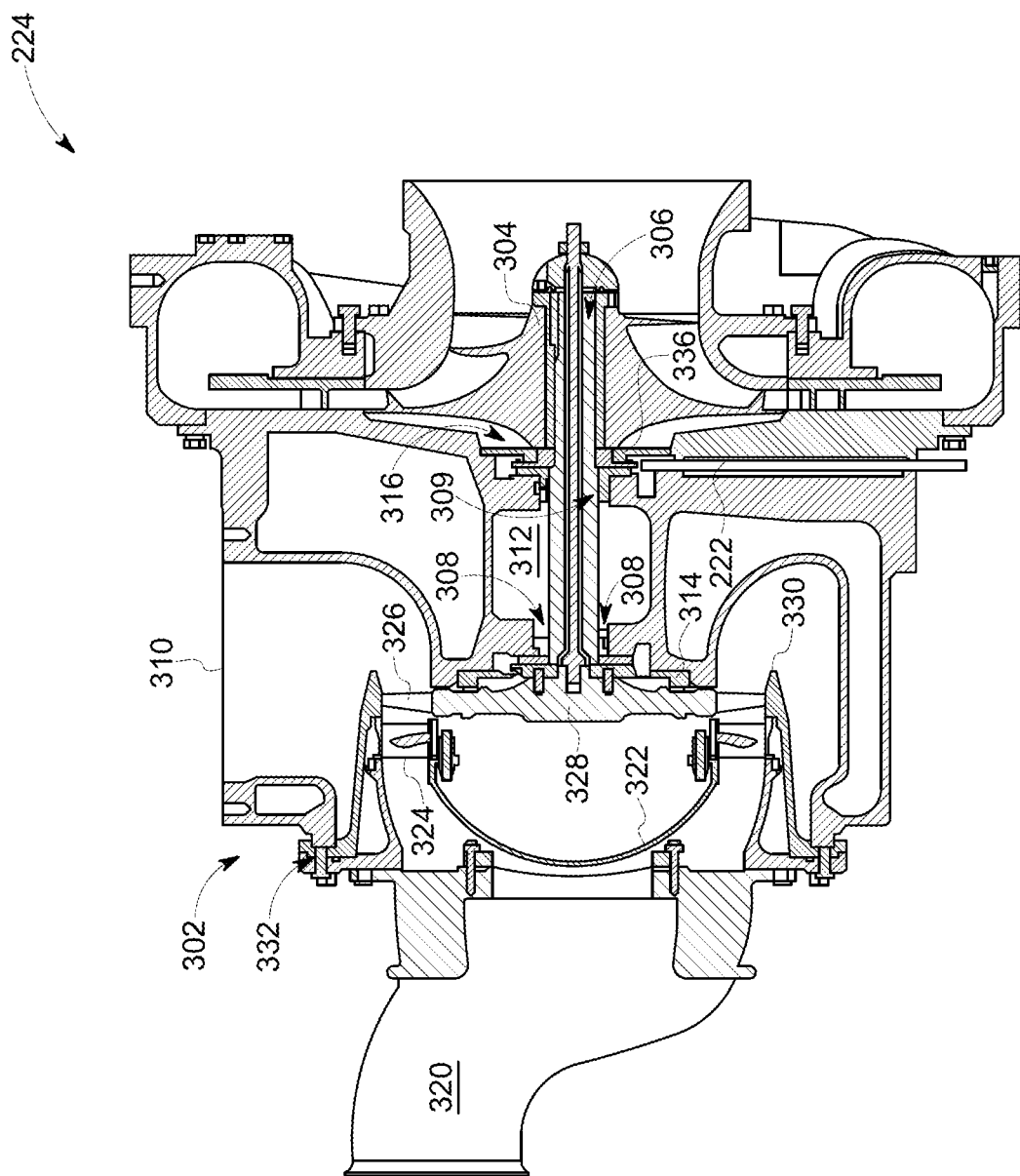
FIG. 3 is an illustration of an embodiment of a turbocharger.

FIG. 3 is an illustration of an embodiment of the turbocharger 224. The turbocharger 224 may be mechanically coupled (e.g., fastened) to the engine 230 of the propulsion subsystem 208. In another example, the turbocharger 224 may be coupled between the exhaust passage and the intake passage of the engine 230. In another example, the turbocharger may be coupled to the engine 230 by any other suitable manner.

The turbocharger 224 includes a turbine stage 302 and a compressor 304. Exhaust gases from the engine pass through the turbine stage 302, and energy from the exhaust gases is converted into rotational kinetic energy to rotate a shaft 306 which, in turn, drives the compressor 304. Ambient intake air is compressed (e.g., the pressure of the air is increased) is drawn through the rotating compressor 304 such that a greater mass of air may be delivered to the cylinders of the engine.

The turbocharger 224 includes a casing 310. Optionally, the turbine stage 302 and the compressor 304 may have separate casings which are bolted together, for example, such that a single unit (e.g., turbocharger 224) is formed. As an example, the turbocharger 224 may have a casing 310 made of cast iron, and the compressor 304 may have a casing made of an aluminum alloy, gray iron, and/or the like.

The turbocharger 224 further may include a turbine bearing 308 and a compressor bearing 309 to support the shaft 306, such that the shaft 306 may rotate at high speed with reduced friction. The turbocharger 224 may further include two non-contact seals (e.g., labyrinth seals), a turbine labyrinth seal 314 positioned between an oil cavity 312 and the turbine disc 328 and a compressor seal 316 positioned between the oil cavity 312 and the compressor 304. The oil cavity 312 includes one or more oil filters 311 positioned proximate to the oil cavity 312.

Exhaust gas may enter through an inlet, such as gas inlet transition region 320, and pass over a nosepiece 322. A nozzle ring 324 may include airfoil-shaped vanes arranged circumferentially to form a complete 360° assembly. The nozzle ring 324 may act to optimally direct the exhaust gas to a turbine disc/blade assembly, including blades 326 and a turbine disc 328, coupled to the shaft 306. Additionally or alternatively, the turbine disc 328 and blades 326 may be an integral component, known as a turbine blisk. The rotating assembly of the turbine, including the turbine disc 328, blades 326, and shaft 306, may collectively be referred to as the turbine rotor.

The blades 326 may be airfoil-shaped blades extending outwardly from the turbine disc 328, which rotates about the centerline axis of the turbocharger 224. An annular shroud 330 is coupled to the casing at a shroud mounting flange 332 and arranged to closely surround the blades 326 and thereby define the flow path boundary for the exhaust stream flowing through the turbine stage 302.

Returning to the description of FIG. 2, the propulsion subsystem 208 may include one or more sensors 222. The one or more sensors 222 are configured to measure one or more parameters of the propulsion subsystem 208. For example, the one or more sensors 222 may include magnetic sensors (e.g., Hall Effect sensors), speed sensors, pressure sensors, ultrasonic sensors, temperature sensors, vibration sensors, distance sensors, and/or the like. The one or more sensors 222 are configured to detect a rotor speed and/or the blades 326 of the propulsion subsystem 208. The one or more parameters may represent characteristic data (e.g., notch settings, throttle, speed data, temperature data, pressure data, oscillation, and/or the like) of the propulsion subsystem 208 of the vehicle 200. Optionally, as shown in FIG. 2, the one or more sensors 222 may be a part of the propulsion subsystem 208. For example, at least one sensor 222 may be utilized to measure the speed of the rotor of the engine.

In another example, in connection with FIG. 3, at least one of the sensors 222 may be positioned within the turbocharger 224. The sensor 222 may be configured to determine a speed of the turbine rotor based on the interaction between the sensor 222 and a notched or toothed wheel of the turbocharger 224. For example, the sensors 222 are positioned adjacent to turbine thrust collar 336. The turbine thrust collar 336 may be annular shaped and substantially surround a portion of shaft 306. As such, the thrust collar 336 may rotate with the shaft 306. The thrust collar 336 may include a plurality of notches that, when in alignment with a central axis of the sensor 222, cause an increase in the voltage output by the sensor 222. Based on the frequency of the voltage output, the speed of the turbocharger 224 may be determined.

Each of the one or more sensors 222 may generate a sensor measurement signal, which is received and/or acquired by the controller circuit 202. The sensor measurement signals include one or more electrical characteristics representing the parameters acquired by the one or more sensors 222. Based on the one or more electrical characteristics of the sensor measurement signal (e.g., amplitude, voltage, current, frequency, binary sequence, and/or the like), the controller circuit 202 may determine parameters of the propulsion subsystem 208.

Figure 4:
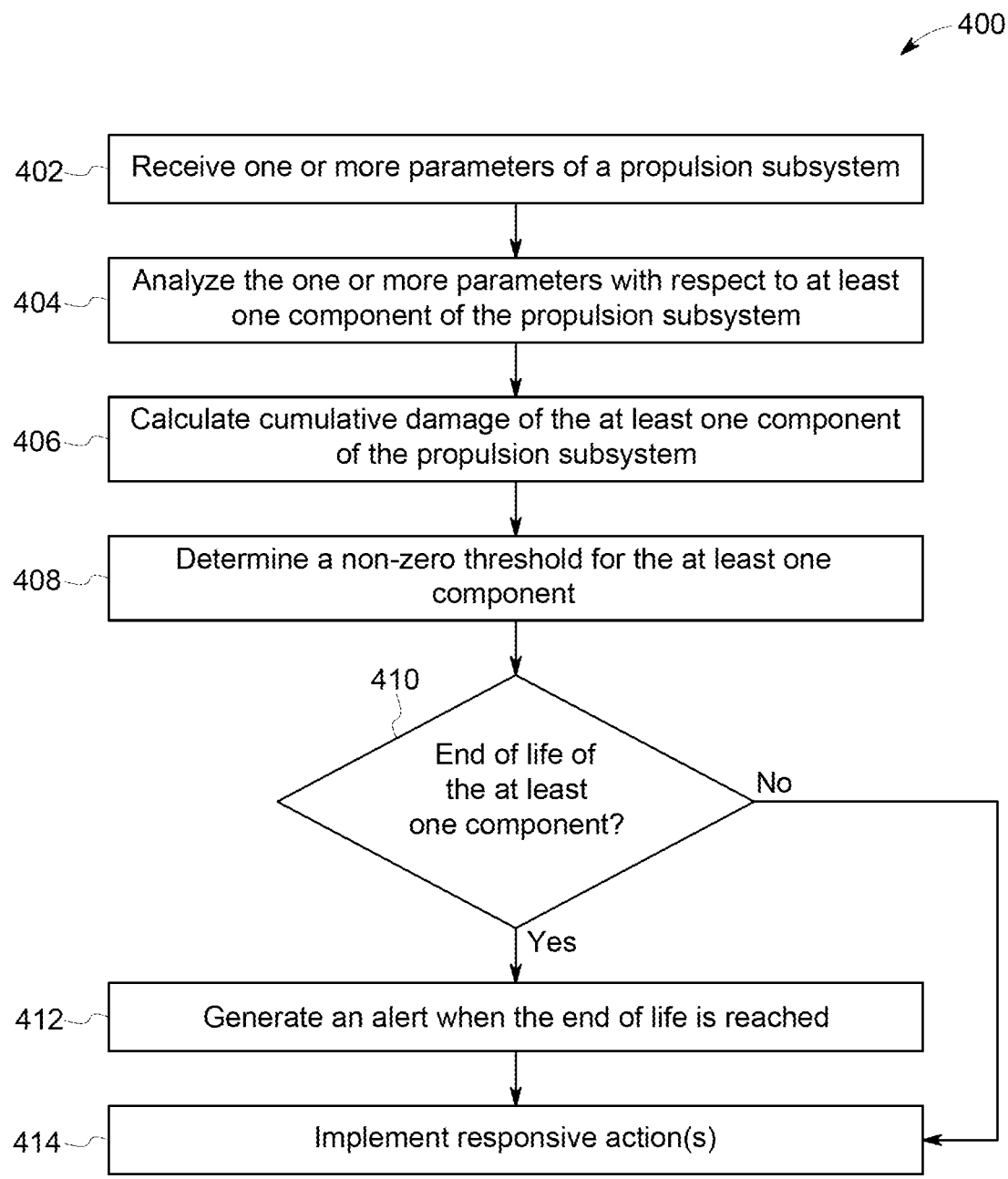
FIG. 4 is a flowchart of an embodiment of a method for detecting degradation of a propulsion subsystem.

FIG. 4 is a flowchart of an embodiment of a method 400 for detecting degradation of a propulsion subsystem. The method 400, for example, may be performed by structures or aspects of various embodiments of the monitoring system described herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method 400 may be able to be used as one or more algorithms to direct hardware to perform one or more operations described herein.

The method 400 may be performed by a remote system off-line and/or remote from the vehicle system 102 and/or the vehicle 200. For example, the one or more parameters may be transmitted to the remote system (e.g., a dispatch stations, remote system, maintenance systems, and/or the like) along with uni and/or bi-directional communication link established by the communication circuit 210. The remote system may include a controller circuit similar to and/or the same as the controller circuit 202 to perform the operations described in the method 400.

At 402, the monitoring system 250 may be configured to receive one or more parameters of the propulsion subsystem 208. For example, the controller circuit 202 can be operably connected to the sensor 222 and receive the parameters of the propulsion subsystem 208. The controller circuit 202 is configured to calculate cumulative damage of the component of the propulsion subsystem 208 based on the parameters, and determine the end of life of the component relative to the cumulative damage. The one or more parameters may represent a characteristic of the operation of the propulsion subsystem 208 over a period of time. The one or more parameters may represent characteristic data (e.g., notch settings, speed data, temperature data, pressure data, oscillation, and/or the like) of the propulsion subsystem 208 of the vehicle 200. For example, at least one of the parameters may represent a speed of the rotor speed of the engine of the propulsion subsystem 208, a speed of the blades 326 and/or rotational speed of the shaft 306 of the turbocharger 224, and/or the like.

The one or more parameters may represent a sensor measurement signal generated by the one or more sensors 222. The measurement signal includes electrical characteristics that represent the one or more parameters. The electrical characteristics may be an amplitude, voltage, current, frequency, binary sequence, and/or the like. Based on the electrical characteristics of the sensor measurement signal, the controller circuit 202 may be configured to determine the one or more parameters.

The cumulative damage can be calculated from the parameters based on previously measured amounts of damage of the same or other components. For example, different amounts of damage to other filters, rotors, cylinders, or the like, can be associated with different numbers of duty cycles in which other turbochargers operated, with different throttle settings by which other turbochargers operated, with different speeds at which vehicles having other turbochargers moved, with different exhaust gas temperatures coming from other turbochargers. The monitoring system can compare the measured parameters of a currently examined turbocharger with these previously measured parameters to estimate or approximate the damage to the currently examined turbocharger. Stated differently, the monitoring system can assume that a first turbocharger is damaged, deteriorated, or has a reduced remaining service life as a second turbocharger based on the first and second turbochargers having the same sensor parameters, where the remaining service life of the second turbocharger previously was measured.

Additionally or alternatively, the monitoring system can project and/or forecast the cumulative damage based on a trip plan generated by the energy management system 220. The energy management system is configured to generate a new trip plan and/or modify the trip plan into a modified trip plan based on a least one of the cumulative damage or the end of life. The monitoring system receives parameters from the sensors 222 that may indicate damage to the components thus far. The monitoring system can examine the operational settings dictated by the trip plan and project additional damage to the components. For example, the monitoring system can predict that an oil filter will become significantly more clogged when the trip plan dictates that the propulsion system operate at higher throttle settings than when the trip plan dictates smaller throttle settings. The projected damage can be based on previous trips by the same or other vehicle systems, where the operational settings dictated by a trip plan are the same as (or similar to, such as within 10%) the operational settings used by a vehicle system in a previous trip. The additional damage or deterioration to a component from a previous trip can be expected to occur to a component for an upcoming trip based on the previous operational settings of the vehicle during the previous trip being the same as or similar to the operational settings dictated by the trip plan for the upcoming trip. The monitoring system can use the previously measured additional damage or deterioration as a benchmark or estimate of the additional damage that is expected to occur for the upcoming trip.

The monitoring system can examine the additional damage that is expected to happen to the component in the upcoming trip based on the trip plan and determine whether to change the trip plan (or request a change to the trip plan). For example, if the additional expected or predicted damage due to operation according to the trip plan will exceed a designated threshold (e.g., a percentage of filter clogging, an exhaust gas temperature, etc.), then the monitoring system can request a new or different trip plan. As another example, if the monitoring system determines that the additional expected or predicted damage due to operation according to the trip plan will reduce the remaining service life of the component below a designated threshold (e.g., a time that will occur before conclusion of the trip), then the monitoring system can request a new or different trip plan.

The trip plan can be modified or a new trip plan can be created by the energy management system responsive to receiving a request (e.g., via a data signal) from the monitoring system. The energy management system can modify or create a trip plan by reducing the operational settings at one or more locations or times in the trip. For example, the modified or new trip plan can have lower throttle settings or speeds in locations having hotter ambient temperatures to reduce damage to the turbocharger. As another example, the modified or new trip plan can cause the vehicle to travel over another, different route to avoid travel through more polluted areas or through airflow constricted areas (e.g., in tunnels) to avoid further clogging of a filter.

The trip plan that is modified or created may result in less wear or use of the component relative to the operation of the vehicle system 102 according to the previous trip plan.

At 404, the monitoring system may be configured to analyze the one or more parameters with respect to at least one component of the propulsion subsystem 208. For example, the at least one component may be a part of the one or more engines, motors, alternators, generators, turbochargers 224, brakes, oil filters 311, batteries, turbines, the rotor speed, and/or the like. For example, the at least one component may be the shaft 306, bearings 308-309, compressor 304, seal 314, turbine disc 328, blades 326, and/or the like, of the turbocharger 224. In another example, the at least one component may be the rotor, bearings, oil filters 311 (e.g., centrifuge lube oil filters), and/or the like of the one or more engines of the propulsion subsystem 208.

Figure 6:
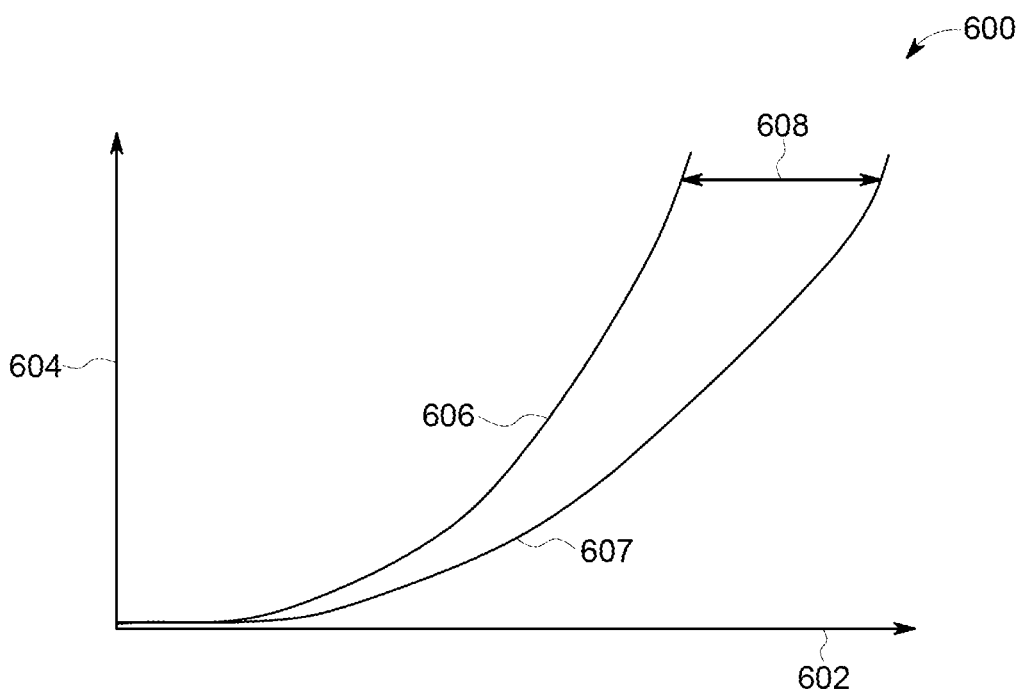
FIG. 6 is a graphical illustration of an embodiment of first and second parameters.

Optionally, the monitoring system may be configured to analyze the one or more parameters to determine a usage duty cycle of the propulsion subsystem 208 based on the one or more parameters (e.g., the first and second parameters 606, 607 shown in FIG. 6). The usage duty cycle may indicate a level or magnitude of stress and/or fatigue exhibited on the at least one component of the propulsion subsystem 208. The usage duty cycle indicates an amount of use of the vehicle system 102 during operation of the trip plan. Based on the usage duty cycle, the controller circuit 202 may measure the cumulative damage of the at least one component of the vehicle system 102. For example, the controller circuit 202 receives the parameters from the sensors 222 and determines an amount of stress and/or fatigue exhibited on the at least one component based on the received parameters. The stress and/or fatigue may be calculated by the controller circuit 202 based on a set of mechanical specifications of the at least one component stored in the memory 212. The mechanical specifications may include a plurality of fatigue and/or stress levels exerted on the at least one component with corresponding levels of the one or more parameters over a period of time. For example, one of the parameters may represent a rotational speed of the turbine rotor (e.g., includes the turbine disc 328, blades 326, and shaft 306) of the turbocharger 224, the rotor speed, and/or the like. The controller circuit 202 may identify an amount of fatigue and/or cumulative damage based on the rotational speed (e.g., the one or more parameters, throttle, notch settings) over the period of time for the one or more parameters in the mechanical specifications stored in the memory 212.

At 406, the controller circuit 202 may be configured to calculate the cumulative damage of the component of the propulsion subsystem 208. The cumulative damage may represent a total amount of damage to the component during operation of the propulsion subsystem 208 for the life of the at least one component. Fatigue may cause the damage, stress, or material build-up (e.g., debris, soot cake, and/or the like) on the component. The cumulative damage may also be a combination of multiple service life events, some of which may have occurred from alternative propulsion subsystems of the at least one component. For example, the component may have experienced cumulative damage in another propulsion subsystem and/or vehicle, which was overhauled or repaired. The cumulative damage of the at least one component of the propulsion subsystems may be tracked, recorded, and/or accounted and stored in the memory 212, which can be used to calculate the cumulative damage. For example, the cumulative damage exerted on the component within the propulsion subsystem may be tracked, recorded, and/or accounted based on Equation 1 (below). The controller circuit 202 may determine the cumulative damage of the at least one component based on the one or more parameters utilizing a cumulative damage model stored in the memory 212 based on Equation 1.

For example, the cumulative damage model may be based on Miner's rule as shown in Equation 1 below.

$$\sum_{i=1}^{k} \frac{n_i}{N_i} = C \qquad \text{Equation (1)}$$

The variable k represents a number of stress and/or fatigue levels exhibited on the at least one component. For example, the variable k may correspond to the level of fatigue and/or stress applied to the at least one component based on the cells 524 of the rainflow cycle count matrix 500 shown in FIG. 5 corresponding to a number of transitions between notch settings. The variable $n_i$ represents a number of cycles accumulated at the stress and/or fatigue level. The variable $N_i$ is the number of cycles to failure of at constant stress and/or fatigue level (e.g., at k). Optionally, the variable $N_i$ may be defined by the mechanical specifications stored in the memory 212. The variable C represents a fraction of operable life consumed during operation of the propulsion subsystem 208 for the end of life of the at least one component. For example, when the variable C is equal to 1, the component fails and/or has reached the end of life. Additionally or alternatively, the variable C may not be 1 for the failure of the at least one component to occur. For example, the variable C may be more and/or less than one based on testing by the manufacturer and/or operational history of the component of the propulsion subsystem 208. For example, responsive to see being less than one, the component may be not reach the end of life.

Based on Equation 1, the monitoring system 250 may calculate a proportion of operable life consumed of the at least one component at each stress and/or fatigue level. The monitoring system 250 may sum the one or more parameters together to determine the fraction of the remaining life of the at least one component corresponding to the cumulative damage. The monitoring system may store the cumulative damage of the component in the memory 212. Additionally or alternatively, the monitoring system 250 may adjust the digital model of the propulsion subsystem 208 based on the cumulative damage. For example, the digital model may be modified to reflect the additional damage done to the component.

Optionally, the monitoring system 250 may calculate a projected life of the at least one component. The projected life of the component may represent a fraction of the operable life not consumed during operation of the propulsion subsystem 208. The operable life of the component may be based on the one or more parameters measured by the one or more sensors 222. For example, the projected life may represent an amount of operable life prior to the end of life of the component. Optionally, the projected life of the component may be a difference of the variable C of Equation 1 (e.g., a change in the value of C).

In one or more embodiments, the monitoring system may generate a model of the propulsion subsystem 208 based on the one or more parameters. For example, the controller circuit 202 may generate a digital model of the turbocharger 224 based on the one or more parameters. The digital model may be stored in the memory 212, and represent a status based on the one or more parameters acquired by the sensors 222. Based on the usage duty cycle, the controller circuit 202 determines the cumulative damage from the level or magnitude of stress and/or fatigue exhibited on the at least one component. The model may be updated with additional resource data during additional usage duty cycles of the component.

Additionally or alternatively, the controller circuit 202 may be configured to determine an amount of fatigue and/or stress exhibited on the at least one component utilizing a rainflow cycle count matrix 500. In connection with FIG. 5, the rainflow cycle count matrix 500 may represent changes in one or more parameters during a period of time. For example, the one or more parameters may represent different notch settings (e.g., throttle). The notch settings may correspond to speed and/or throttle selected by the user interface 204 and/or the energy management system 220 executing the trip plan of the vehicle 200.

Figure 5:
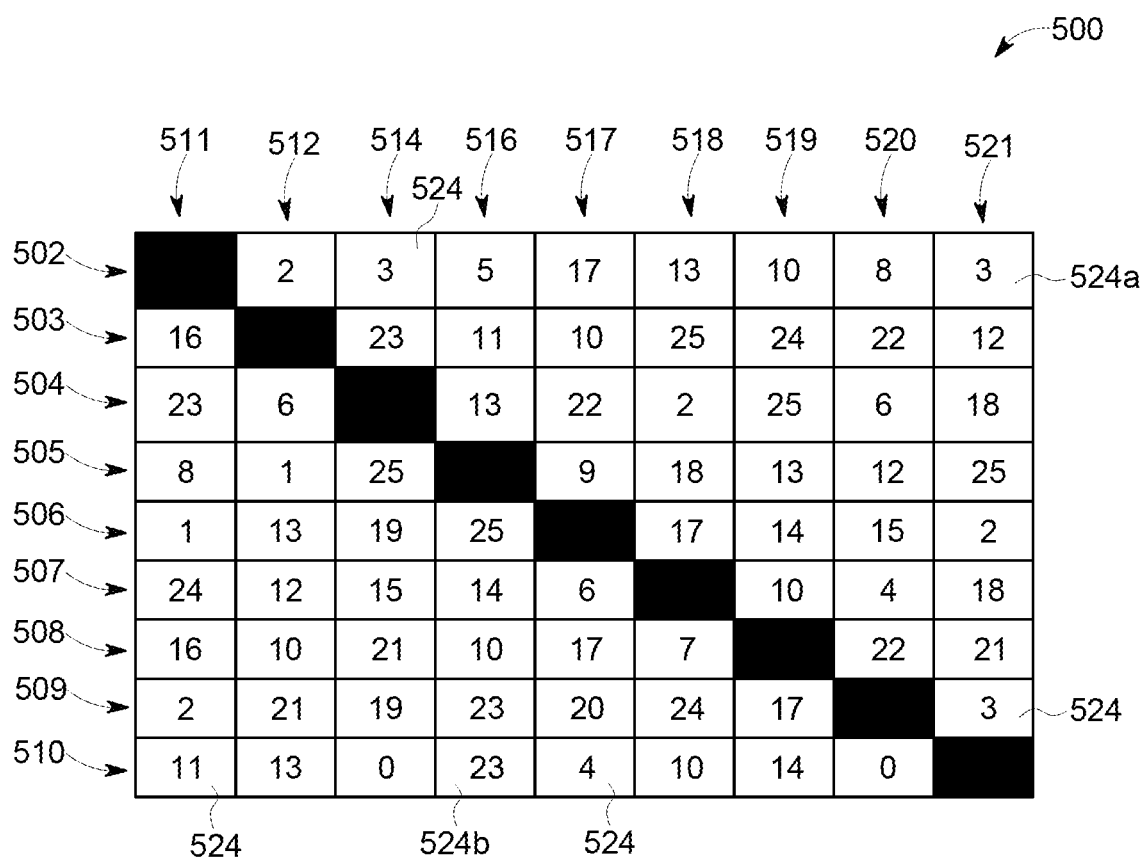
FIG. 5 is an embodiment of a rainflow cycle count matrix.

FIG. 5 is an embodiment of a rainflow cycle count matrix 500. The matrix 500 includes a set of rows 502-510 and columns 511-521. Each of the rows 502-510 and the columns 511-521 may represent different notch settings (e.g., throttle). For example, the vehicle 200 may have nine or more different notch settings representing different speeds and/or throttle of the propulsion subsystem 208. The matrix 500 includes a plurality of cells 524 each representing magnitude of changes in notch settings over a period of time. For example, each of the rows 502-510 may be a reference notch, and the columns 511-521 may represent the transition notch. The reference notch may represent an initial throttle and/or notch setting during the trip plan. The transition notch may represent a movement of the throttle and/or notch setting during the trip plan relative to the reference notch. For example, the reference notch may be positioned at a two throttle and/or notch setting, and the transition notch may adjust the throttle and/or notch setting to seventeen. An adjustment of the transition notch relative to the reference notch may indicate fatigue and/or stress exhibited on the component. For example, the controller circuit 202 may receive the adjustment of the throttle and/or notch settings, which may indicate additional stress on the component. The matrix 500 illustrates changes from the reference notch to the transition notch. The period of time may correspond to an amount of time to complete the trip plan executed by the energy management system 220, a length of time (e.g., a week, a month, a year, and/or the like), and/or the like. The plurality of cells 524 may represent a number of transitions of the notch settings (e.g., from the rows 502-510 to the columns 511-521) over a period of time. For example, the cell 524*a* may represent three transitions from notch one, represented by the row 502, to notch nine, represented by the column 521. In another example, the cell 524*b* may represent twenty-three transitions from notch nine, represented by the row 510, to notch four, represented by the column 516.

Based on the transitions between the notch settings (e.g., throttle), the controller circuit 202 may determine a level of fatigue and/or stress exhibited on the at least one component over the period of time. For example, each transition of the notches may correspond to a different amount of fatigue and/or stress for the at least one component based on the different notch settings (e.g., throttle). The controller circuit 202 may determine an amount of cumulative damage of the at least one component based on the set of mechanical specifications of the at least one component stored in the memory 212. For example, the controller circuit 202 determines the cumulative damage based on the level of fatigue and/or stress exhibited relative to the set of mechanical specifications. Optionally, the controller circuit 202 may add the different fatigue and/or stress values together to determines the end of life of the at least one component.

FIG. 6 is a graphical illustration 600 of one example of first and second parameters 606, 607. The first parameter 606 is temporally different than the second parameter 607. For example, the first parameter 606 may have been acquired during a different one of the trip plans relative to the second parameter 607. For example, the first and second parameters 606, 607 both may represent rotational speeds of a rotor that are measured during different trips of the vehicle, or during different segments of the same trip of the vehicle. Alternatively, the parameters 606, 607 can represent moving speeds of the vehicle 200 during different trips of the vehicle, or during different segments of the same trip of the vehicle. The first and second parameters 606, 607 are shown along a horizontal axis 602 representing time and a vertical axis 604 representing speed. One or more of the parameters 606, 607 can be scaled so as to be shown alongside the same vertical axis 604. The parameters 606, 607 may be measured by the one or more sensors 222.

The monitoring system 250 may compare morphologies (e.g., shapes) of the curves representing the first and second parameters 606, 607. For example, the morphology may represent a slope, an amplitude, a number of peaks, shape, and/or the like of the parameters 606, 607. The first and second parameters 606, 607 may be used by the monitoring system 250 to determine the cumulative damage, performance, and/or the like, of the component, such as the oil filter 311. The changes in the morphology between the first and second parameters 606, 607 may be indicate the cumulative damage of the at least one component. For example, the component may be a lubricant and/or oil filter (e.g., centrifuge filter) of the engine of the propulsion subsystem 208. During operation of the propulsion subsystem 208, debris (e.g., soot cake) may disturb the flow of lubricant and/or oil traversing through the oil filter. The obstruction of the flow of the lubricant and/or oil affects the morphology of the first and second parameters 606, 607 (e.g., adjust the magnitude of the slope) and performance of the propulsion subsystem 208. The affected performance of the propulsion subsystem 208 may be reflected in a change in the morphology of the one or more parameters measured by the one or more sensors 222.

As another example, the first and second parameters 606, 607 may represent the rotor speed of the turbocharger 224 that is spinning at a given operating point. The operating point may be based on the rotor speed, throttle, notch setting, and/or the like. Responsive to the turbocharger 224 shut down, the oil pressure through the oil filters 311 may be reduced. The turbocharger 224 shut down may prevent the rotor speed to halt and/or stop oil from passing through the oil filters 311. The monitoring system 250 may detect the rotor speed via the one or more sensors 222 stored in the memory 212 and record the amount of time elapsed until the first and second parameters 606, 607 stop. The changes of the first and second parameters 606, 607 may create a profile that can correlate the rotor speed behavior and may identify discrepancies and/or issues of the oil filters 311. For example, the differences of the oil filters 311 may represent a clean filter, issues with the filter, soot cake, mass building on the oil filters 311, and/or the like.

The monitoring system 250 may identify a shift 608 in the parameters 606, 607 based on differences in the morphologies of the first and second parameters 606, 607. Based on the change in morphology (e.g., represented as the shift 608), the monitoring system may calculate or estimate the cumulative damage or additional damage to the component. For example, larger shifts 608 can be associated with greater amounts of increased damage, while smaller shifts 608 are associated with lesser amounts of increased damage. Additionally or alternatively, the cumulative or additional damage may be determined by the monitoring system 250 based on rates of change in the parameter 606 and/or 607. For example, the acceleration may be represented as a slope of the first and second parameters 606, 607. The controller circuit 202 may calculate changes in the slope (e.g., acceleration) between the first and second parameter 606, 607 to determine the cumulative damage of the at least one component based on the shift 608. For example, the shift 608 may represent the cumulative damage of the at least one component and/or an end of life of the component based on the first and second parameters 606, 607.

Figure 7:
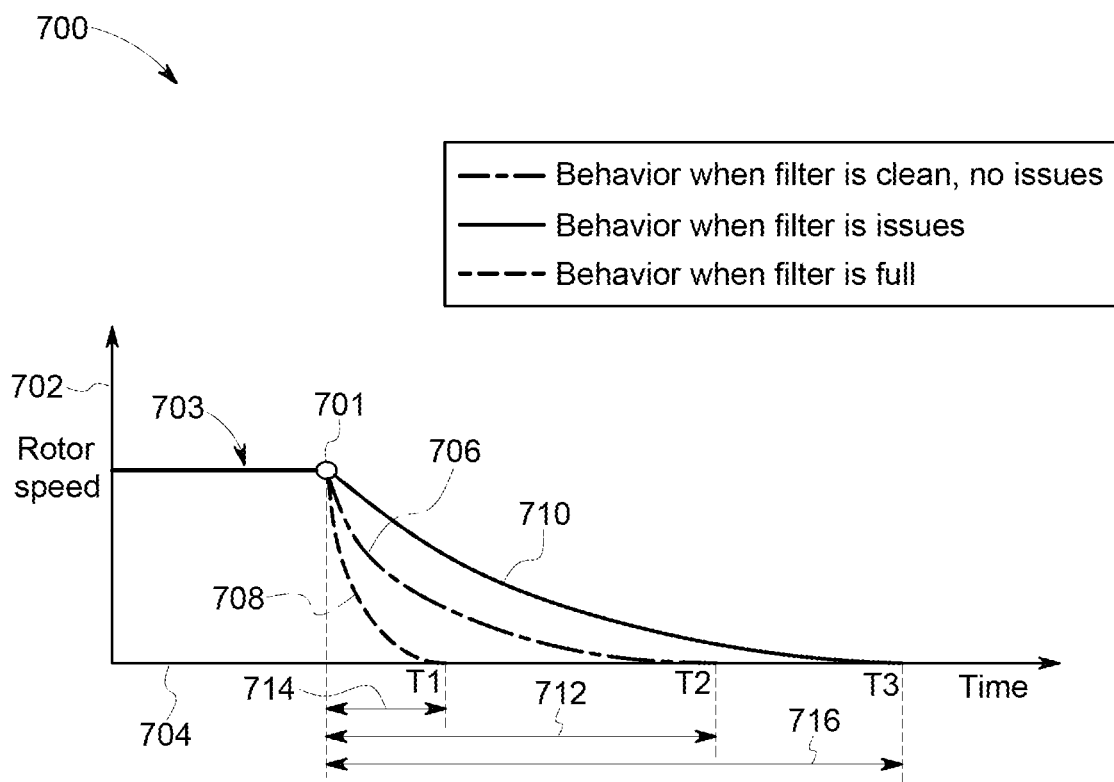
FIG. 7 is a graphical illustration of an embodiment of behavior of an oil filter.

FIG. 7 is a graphical illustration 700 of an embodiment of behavior of the oil filters 311. The graphical illustration 700 shown along the vertical axis 702 that represents rotor speed, and a horizontal axis 704 that represents time. The graphical illustration 700 includes three different profiles of the rotor speed (e.g., based on the one or more parameters from the one or more sensors 222).

Each profile 706, 708, 710 represents decay of the speed at which a rotor of a turbocharger spins following deactivation of an engine or the turbocharger onboard the vehicle. The monitoring system can create the profiles based on sensor parameters that are measured over time. For example, during each of first, second, and third trips of the same vehicle having the same turbocharger, the rotor of the turbocharger can be rotating at a constant or substantially constant speed (e.g., does not vary by more than 5%) 703. Upon deactivating the engine or turbocharger, the speed of the rotor may begin to decrease. During a first trip, the rotor speed decreases from the speed 703 at a deactivation time 701 to a stationary speed at a time $t_2$ within a first time period 712. The decrease in rotor speed with respect to time for this first trip is represented by the first profile 706. During a subsequent second trip, the rotor speed decreases from the speed 703 at the deactivation time 701 to a stationary speed at a time $t_1$ within a shorter second time period 714. The decrease in rotor speed with respect to time for this second trip is represented by the second profile 708. During a subsequent third trip, the rotor speed decreases from the speed 703 at the deactivation time 701 to a stationary speed at a time $t_3$ within an even longer third time period 716. The decrease in rotor speed with respect to time for this third trip is represented by the third profile 710.

The decrease in time needed for the rotor speed to decrease to zero may be due to a buildup of mass (e.g., soot cake) on the oil filters 311 and/or debris accumulated on the filters 311. For example, the mass builds up on the oil filters 311 and may clog and/or prohibit flow of the oil and/or lubricant through the oil filters 311. This can cause the rotor to continue spinning longer after deactivation. In one example, the first profile 706 represents behavior of the rotor when the oil filter 311 is new or clean, and is operating properly. The second profile 708 can represent behavior of the rotor when the oil filter 311 is full of debris or mass, and is not able to properly filter oil. The third profile 710 can represent behavior of the rotor when the oil filter 311 is not operating correctly due to other damage to the filter 311.

Damage to the oil filters 311 may affect the ability of the oil filters 311 to properly allow oil and/or lubricant to pass through the oil filters 311. Based on examination of the profiles 706, 708, 710, the monitoring system 250 may instruct the display 206 to present a diagnostic message to alert the need of servicing of the oil filters 311. For example, the monitoring system 250 displays a diagnostic message to alert for possible malfunctions and/or defects of the oil filter 311 based on the profile 710. Additionally or alternatively, the monitoring system optionally may instruct the energy management system 220 to adjust the trip plan based on detection of the profile 708 and/or 710. For example, the monitoring system 250 may identify the profile 710 and determine that the oil filters 311 are damaged. The monitoring system can then instruct the energy management system 220 to adjust the trip plan based on the damage to the oil filters 311. For example, the energy management system 220 may indicate a new and/or modified trip plan based on the instructions from the monitoring system. The modified and/or new trip plan may reduce the throttle, breaking, schedule, and/or the like, relative to the previous trip plan. Based on the new and/or modified trip plan, additional damage to the oil filters 311 may be reduced relative to the damage that would have occurred with operating according to the previous trip plan. The new or adjusted trip plan may prolong and/or extend the end of life of the filter for longer than the entire duration of the modified or new trip plan. For example, the modification of the modified and/or new trip plan may result in less wear or use of the component relative to the operation of the vehicle system 102 according to the previous trip plan.

Optionally, the monitoring system may instruct the display 206 to indicate that the oil filters 311 may be damaged based on the profiles 708, 710. For example, the operator may be advised via the display 206 by the monitoring system via a diagnostic message, a code (e.g., indicating a need to inspect the oil filters 311), or the like, to alert the operator of a required corrective action. Optionally, the monitoring system can direct the controller circuit 202 to restrict the engine operation in case a critical issue is detected (e.g., the profile 710). In another example, responsive to identifying the profile 708, the monitoring system can automatically communicate with a scheduling system to schedule the maintenance or replacement of the oil filter.

At 408, the monitoring system may be configured to determine a non-zero threshold for the at least one component. The non-zero threshold may be based on the cumulative damage with respect to the fraction of life consumed (e.g., the variable C) and/or the rainflow cycle count matrix 500 shown in FIG. 5. Optionally, the non-zero threshold may be a magnitude, percentage, and/or the like prior to the fraction of life consumed of C approximately one (e.g., as shown in Equation 1). For example, the monitoring system can determine the end of life of the component based on the non-zero threshold, with the end of life being farther away (e.g., longer) for bigger differences between the cumulative damage and the threshold, and the end of life being closer (e.g., shorter) for smaller differences between the cumulative damage and the threshold.

Additionally or alternatively, the non-zero threshold may be based on a trip plan that will be executed by the energy management system 220. For example, the monitoring system may be configured to analyze the trip plan based on the throttle assigned during the trip plan for the propulsion subsystem 208. Additionally or alternatively, the controller circuit 202 may be configured to utilize the trip plan generated by the energy management system 220 to predict an amount of cumulative damage for the at least one component. In connection with FIG. 7, the controller circuit 202 may calculate a probability of damage 706 based on the throttle along the trip plan. Higher throttle settings can be associated with increased probabilities of damage, while lower throttle settings can be associated with reduced probabilities of damage. The threshold can be determined based on the probability of damage, with the threshold being smaller for greater probabilities of damage and larger for smaller probabilities of damage. The monitoring system can instruct the energy management system 220 to adjust the throttle of the propulsion subsystem 208 based on the cumulative damage. For example, the monitoring system can instruct the energy management system to reduce a throttle setting dictated by a trip plan by more for greater cumulative damage, and by lesser settings for lesser cumulative damage.

Figure 8:
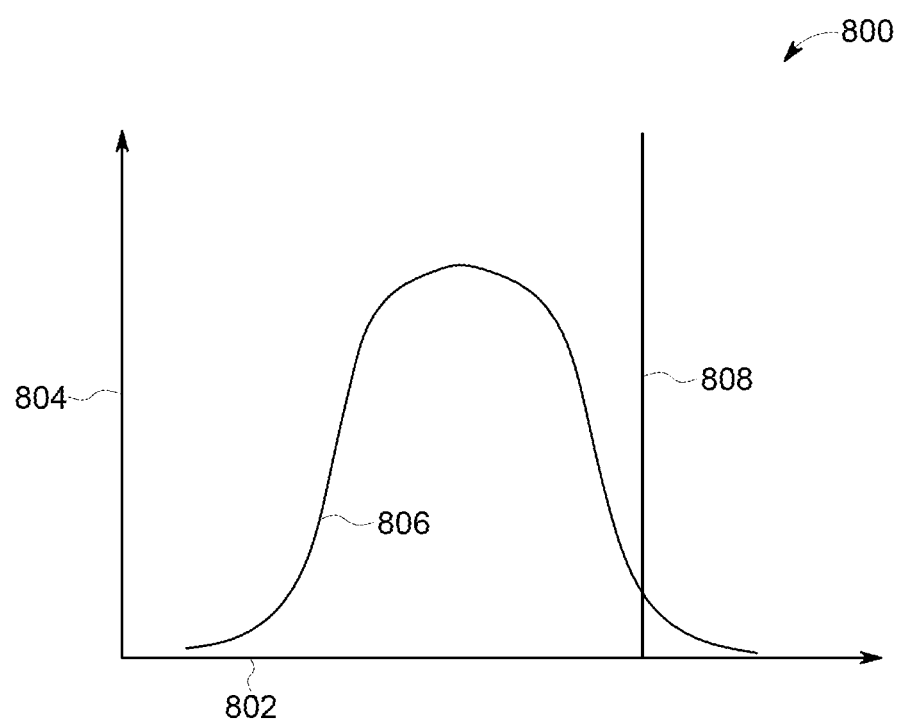
FIG. 8 is a graphical illustration of an embodiment of probability of damage of at least one component of a propulsion subsystem.

FIG. 8 is a graphical illustration 800 of an embodiment of the probability of damage 806 of the component of the propulsion subsystem 208. The probability of damage 806 is shown along a horizontal axis 802 representing damage of the component, and a vertical axis 804 representing a probability of additional damage to the component. The amount of damage may be determined by the monitoring system 250 based on the throttle and the mechanical specifications of the component stored in the memory 212 (e.g., as described in operation 404). The probability of damage 806 may be based on operation of one or more trip plans. For example, trip plans that dictate settings placing a greater load on components of the propulsion system may be associated with increased probabilities of damage 806, while trip plans that dictate settings placing a lesser load on components of the propulsion system may be associated with decreased probabilities of damage 806.

The likelihood that the component will be damaged or fail during an upcoming trip can be determined by identifying a position along the horizontal axis 802, and determining the probability of damage 806 at that position. The position along the horizontal axis 802 can be based on the usage duty cycle of the propulsion subsystem 208. For example, the turbocharger 224 having many duty cycles involving transitioning between extreme throttle settings (e.g., from notch one to nine) may be positioned closer to the center of the horizontal axis 802 (e.g., the location of the peak probability of damage 806), while a turbocharger having fewer duty cycles and/or smaller changes in throttle settings.

Additionally or alternatively, the controller circuit 202 may set the non-zero threshold based on the morphology of the one or more parameters. For example, the controller circuit 202 may set the non-zero threshold relative to a difference between the morphologies of the first and second parameters 606, 607 (FIG. 6). The non-zero threshold may be a percentage, magnitude, and/or the like difference between the morphologies of the first and second parameters 606, 607. For example, the non-zero threshold may represent a shift magnitude, acceleration, and/or the like of the first and second parameters 606, 607. Larger shifts 608 between the parameters 606, 607 can be associated with smaller thresholds, while smaller shifts 608 between the parameters 606, 607 can be associated with larger thresholds.

At 410, the monitoring system can determine whether the end of life is reached and/or whether maintenance or servicing of the component is needed. For example, the monitoring system may compare the cumulative damage of the component (e.g., the value of C) with the non-zero threshold 808 to determine whether the end of life is reached, or to determine that maintenance or service of the component is needed. The maintenance or servicing of the at least one component may represent cleaning, replacing, repairing, and/or the like of the at least one component during an overhaul even, scheduled maintenance, and/or the like.

Figure 9:
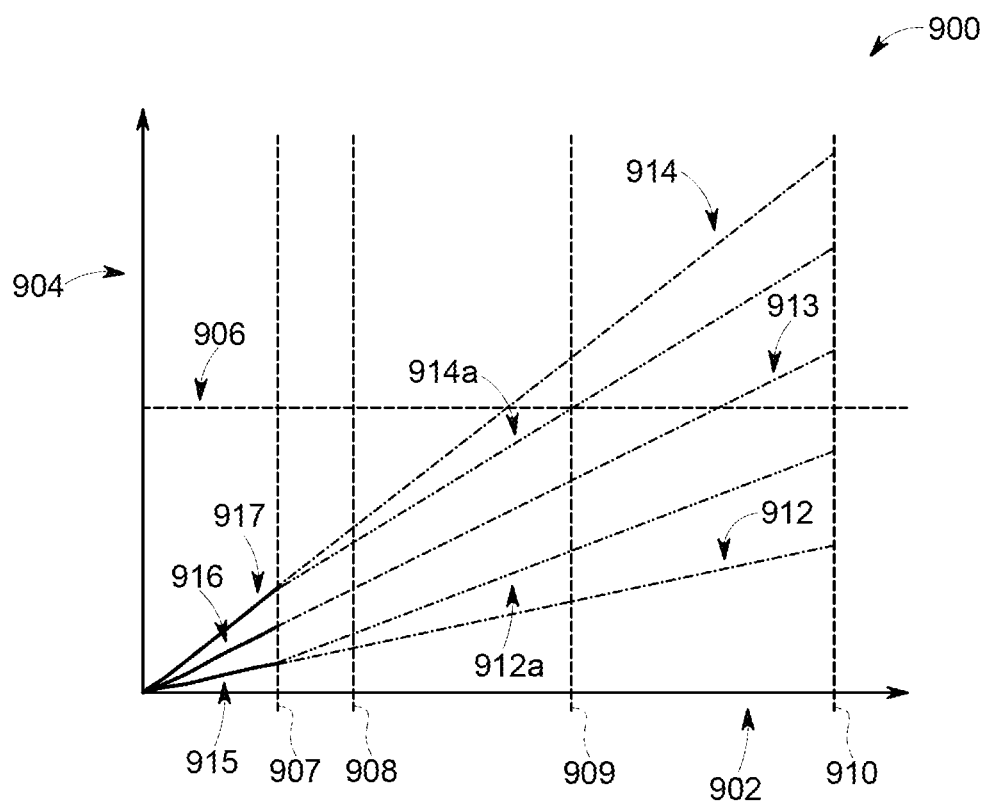
FIG. 9 is a graphical illustration of an embodiment of a probability of failure of at least one component of a propulsion subsystem exceeding a threshold limit of failure.

FIG. 9 is a graphical illustration 900 of different probabilities of failure 912, 913, 914 of a component of the propulsion subsystem 208, as determined by the monitoring system. The probabilities of failure 912, 913, 914 can be calculated by the monitoring system over multiple trips based on predicted cumulative damage of the component. The probabilities of failure 912, 913, 914 increase with respect to time as the component continues to be used, starting at an initial time 907.

A non-zero threshold 906 indicates a threshold limit of failure. The threshold 906 may represent a point when the probabilities of failure 912, 913, 914 indicate that the component has reached the end of life of the component. For example, the component may reach the end of life responsive to the probability of failures 912, 913, or 914 crossing the threshold 906.

The probabilities of failure 912, 913, 914 are shown along a horizontal axis 902 representing time and/or operation time, and a vertical axis 904 that represents increased likelihoods of component failure (e.g., upward along the vertical axis 904). The times at which different overhaul or servicing events 908, 909, 910 occur are shown along the horizontal axis 902. The overhaul events 908, 909, 910 represent predetermined periods when the vehicle 104, 106, 200 reaches a scheduled maintenance cycle. During the overhaul events 908, 909, 910, the component may be repaired or replaced.

Based on the different probabilities of failure 912, 913, 914, the monitoring system 250 may be configured to adjust an operation of the vehicles 104, 106, 200. For example, the monitoring system 250 may instruct the energy management system 220 to adjust the trip plan to allow the components to reach an overhaul event 908, 909, 910 prior to the end of life and/or the probability of failure exceeding the threshold 906. During operation of the vehicle system 102, the monitoring system may instruct the controller circuit to reduce a tractive effort to the reduce the probability of failure 914 to 914a. As another example, during operation of another vehicle system 102, the monitoring system may instruct the controller circuit to increase a tractive effort, which can increase the probability of failure 912 to 912a.

Additionally or alternatively, the controller circuit 202 may be configured to calculate a probability of cumulative damage to the component of the propulsion subsystem 208. For example, the probability of the cumulative damage is calculated by the controller circuit 202 over multiple successive trip plans, time of operation (e.g., days, months, years, and/or the like), and/or the like. The probability of cumulative damage may represent different trajectories of the component of different propulsion-generating vehicles 104, 106, 200 of the vehicle system 102. For example, the probability of damage may be calculated by the controller circuit 202 from a current time (e.g., similar to the time at 907) having calculated cumulative damages based on previous usage duty cycle (e.g., similar to and/or the same as the cumulative damages 915-917). The controller circuit 202 may calculate the probability of the cumulative damage based on the cumulative damage and the current time. The controller circuit 202 may compare the trajectories of the probability of cumulative damage to a threshold. The threshold may represent an end of life and/or probability of failure of the component. For example, when the probability of cumulative damage of the component crosses the threshold the component may have a high probability of reaching the end of life. Based on the probability of cumulative damage, similar to the adjustments described in connection with FIG. 9 above, the controller circuit 202 may adjust operation of the vehicles 104, 106, 200, such as over one or more trip plans to allow the components to reach maintenance and/or overhaul evens prior to end of life and/or portability of failure.

The monitoring system 250 may instruct the energy management system 220 to adjust the trip plans of the vehicle system 102 based on the trajectory of the probability of damage to the component. For example, if the component is associated with the probability of damage 914, the monitoring system can request that the energy management system reduce throttle settings, increase brake settings, or the like, to reduce the probability of damage 914 to 914a.

Additionally or alternatively, the controller circuit 202 may be configured to verify the end of life of the component with a characteristics parameter. For example, the controller circuit 202 may be operably coupled to a second sensor attached to the component. The second sensor may be configured to generate the characteristics parameter. The characteristics parameter may be indicative of oscillation and/or vibration of the component within the propulsion subsystem 208 during operation of the vehicle 200. For example, the second sensor may be an accelerometer mechanically fastened to the oil filter. During operation of the propulsion subsystem 208, soot and/or debris within the oil filter may cause the oil filter to vibrate and/or oscillate. When the controller circuit 202 determines at 410 that the component has reached the end of life, the controller circuit 202 may verify that oscillation and/or vibrations are present in the characteristics parameter.

If the end of life of the component is reached, then at 412, the monitoring system and/or the controller circuit 202 may generate an alert. The alert may be a visual and/or auditory alert configured to alert the operator of the vehicle system 102. For example, the controller circuit 202 may generate a graphical icon, a pop-up window, an animated icon, and/or the like shown on the display 206. In another example, the controller circuit 202 may generate an auditory alert. It may be noted that the alert may be managed by the remote system off-line and/or remote from the vehicle system 102. For example, the remote system may transmit an instruction that is received by the controller circuit 202 via the bi-directional communication link via the communication circuit 210 to generate the alert.

At 414, the monitoring system and/or the controller circuit 202 may be configured to implement one or more responsive actions. It may be noted that the one or more responsive actions may be managed by the remote system off-line and/or remote from the vehicle system 102. The one or more responsive actions may be executed by the controller circuit 202 concurrently with and/or automatically when the alert is generated at 412. The responsive actions can include automatically scheduling maintenance or replacement of the component, changing a trip plan of the vehicle that includes the component (as described herein), and/or restricting operation of the vehicle. For example, the controller circuit may apply one or more limits on the speeds, throttle settings, or the like, to prevent further damage or failure of the component.

In one embodiment, a system includes a sensor configured to detect a parameter of a propulsion subsystem of a vehicle, and one or more controllers configured to generate a first trip plan and to automatically control the vehicle according to the first trip plan. At least one of the controllers is operatively connected to the sensor and configured to receive the parameter of the propulsion subsystem, to calculate a cumulative damage of a component of the propulsion subsystem based on the parameter, and to determine an end of life of the component relative to the cumulative damage. At least one of the one or more controllers is configured to generate a new trip plan or modify the first trip plan into a modified trip plan based on at least one of the cumulative damage or the end of life, where the new trip plan or the modified trip plan is configured, during operation of the vehicle according to the new trip plan or the modified trip plan, for at least one of an adjustment in velocity or avoiding one or more operating conditions of the vehicle, relative to the first trip plan, which results in less wear or use of the component relative to operation of the vehicle according to the first trip plan.

Optionally, the propulsion subsystem includes an oil filter, and the one or more controllers configured to identify an amount of time between a shut down to reduce oil from passing through oil filter. The one or more controllers can be configured to use the amount of time to determine at least one of a clean oil filter, a mass on the oil filter, or damage to the oil filter.

Optionally, the one or more controllers are configured to display a diagnostic message to alert for possible damage to the oil filter based on the amount of time, and the one or more controllers are configured to adjust at least one of a throttle of the vehicle or control settings of the first trip plan that applied to the vehicle during travel along a trip plan based on the damage to the oil filter.

Optionally, the one or more controllers are further configured to adjust one or more throttle settings that are designated in the first trip plan for controlling the vehicle during a trip plan, based on the cumulative damage of the component.

Optionally, the one or more controllers are configured to adjust the one or more throttle settings or a schedule of the vehicle based on the component repair cost of the component.

Optionally, the one or more controllers are further configured to determine a usage duty cycle of the propulsion subsystem, and to determine the cumulative damage based on the usage duty cycle.

Optionally, the one or more controllers are further configured to determine the end of life based on a non-zero threshold. The one or more controllers can be configured to adjust a tractive effort of the propulsion subsystem based on the cumulative damage.

Optionally, the one or more controllers are configured to calculate a rainflow cycle count matrix to determine a level of fatigue or stress exhibited by the propulsion subsystem based on a throttle of the vehicle, and the one or more controllers can be configured to determine the cumulative damage based on the rainflow cycle count matrix.

Optionally, the one or more controllers are configured to determine a non-zero threshold based on a rainflow cycle count matrix, and the one or more controllers can be configured to determine the end of life based on the non-zero threshold.

Optionally, the one or more controllers are configured to adjust at least one of a throttle, a brake, or a schedule of a trip plan of the propulsion subsystem to reduce damage of the component of the cumulative damage.

Optionally, the one or more controllers are configured to determine the end of life based on a morphology of the parameter and another parameter that is detected by the sensor or another sensor.

Optionally, the sensor is configured to acquire at least one of a rotor speed, a pressure, or a temperature of the propulsion subsystem as the parameter.

Optionally, the one or more controllers are configured to determine the cumulative damage trip plan based on a projected life of a component of the propulsion subsystem, the one or more controllers can set a non-zero threshold based on the projected life of the component, wherein the projected life represents an amount of operable life of the component prior to the end of life.

Optionally, the one or more controllers are configured to calculate predicted cumulative damages of the component of the propulsion subsystem based on successive trip plans of the vehicle, and the one or more controllers can be configured to determine different failure trajectories of the component to identify the end of life of the component based on the failure trajectories to determine the end of life.

Optionally, the one or more controllers are configured to generate an alert on a display when the end of life is reached.

Optionally, the alert is at least one of a visual or an audible alert, and the alert automatically schedules maintenance for the component.

In one embodiment, a method includes receiving from one or more sensors parameters measured from a propulsion subsystem of the vehicle, calculating a cumulative damage of a component of the propulsion subsystem based on the parameters, generating a first trip plan (where the first trip plan includes control settings to automatically control the vehicle during a trip plan), determining an end of life of the component relative to the cumulative damage, and generating a new trip plan for controlling the vehicle during the trip plan or modifying the first trip plan into a modified trip plan, responsive to and based on at least one of the cumulative damage or the end of life.

Optionally, the propulsion subsystem includes an oil filter, and the method also includes further comprising identifying an amount of time between a shut down to reduce oil from passing through oil filter. The amount of time can be used to determine at least one of a clean oil filter, a mass on the oil filter, or damage to the oil filter.

Optionally, the method also includes adjusting one or more throttle settings that are designated in the first trip plan for controlling the vehicle during a trip plan, based on the cumulative damage of the component.

Optionally, the method also includes calculating a predicted cumulative damage of the component of the propulsion subsystem based on successive trip plans of the vehicle, and determining different trajectories of the component to identify an end of life of the component based on a probability of failure representing the end of life. The projected life can represent an amount of operable life of the component prior to the end of life.

Multiple instances of "one or more processors" does not mean the systems are embodied in different processors, although that is a possibility. Instead, the one or more processors of the systems described herein may be the same as the one or more processors of the same or different system, such that in one embodiment, different systems can be embodied in the same processor or the same multiple processors.

Components of the systems described herein may include or represent hardware circuits or circuitry that include and/or are connected with one or more processors, such as one or more computer microprocessors. The operations of the methods described herein and the systems can be sufficiently complex such that the operations cannot be mentally performed by an average human being or a person of ordinary skill in the art within a commercially reasonable time period. For example, the generation and/or analysis of the speed signatures may take into account a large amount of factors, may rely on relatively complex computations, and the like, such that such a person cannot complete the analysis of the speed signatures within a commercially reasonable time period.

As used herein, the term "computer," "subsystem," "circuit," "controller circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term computer," "subsystem," "circuit," "controller circuit," or "module".

The "computer," "subsystem," "circuit," "controller circuit," or "module" executes a set of instructions that are stored in one or more storage elements, to process input data. The storage elements may also store data or other information as desired or needed. The storage element may be in the form of an information source or a physical memory element within a processing machine.

The set of instructions may include various commands that instruct the computer," "subsystem," "circuit," "controller circuit," or "module" to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single or multiple pieces of hardware (for example, electronic circuits and/or circuitry that include and/or are connected with one or more processors, microcontrollers, random access memories, hard disks, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
a sensor configured to detect a parameter of a propulsion subsystem of a vehicle; and
one or more controllers,
wherein at least one of the one or more controllers is configured to generate a first trip plan and to automatically control the vehicle according to the first trip plan;
wherein at least one of the one or more controllers is operatively connected to the sensor and configured to receive the parameter of the propulsion subsystem, calculate a cumulative damage of a component of the propulsion subsystem based on the parameter, and determine an end of life of the component relative to the cumulative damage;
wherein at least one of the one or more controllers is configured to generate a new trip plan or modify the first trip plan into a modified trip plan based on at least one of the cumulative damage or the end of life, where the new trip plan or the modified trip plan is configured, during operation of the vehicle according to the new trip plan or the modified trip plan, for at least one of an adjustment in velocity or avoiding one or more operating conditions of the vehicle, relative to the first trip plan, which results in less wear or use of the component relative to operation of the vehicle according to the first trip plan;
wherein the propulsion subsystem includes an oil filter, the one or more controllers configured to identify an amount of time between a shut down to reduce oil from passing through oil filter; and wherein the one or more controllers are configured to use the amount of time to determine at least one of a clean oil filter, a mass on the oil filter, or damage to the oil filter.

2. The system of claim 1, wherein the one or more controllers are configured to display a diagnostic message to alert for possible damage to the oil filter based on the amount of time, and the one or more controllers are configured to adjust at least one of a throttle of the vehicle or control settings of the first trip plan that applied to the vehicle during travel along a trip plan based on the damage to the oil filter.

3. The system of claim 1, wherein the one or more controllers are further configured to adjust one or more throttle settings that are designated in the first trip plan for controlling the vehicle during a trip plan, based on the cumulative damage of the component.

4. The system of claim 3, wherein the one or more controllers are configured to adjust the one or more throttle settings or a schedule of the vehicle based on a component repair cost of the component.

5. The system of claim 1, wherein the one or more controllers are further configured to determine a usage duty cycle of the propulsion subsystem, and to determine the cumulative damage based on the usage duty cycle.

6. The system of claim 1, wherein the one or more controllers are further configured to determine the end of life based on a non-zero threshold, wherein the one or more controllers are configured to adjust a tractive effort of the propulsion subsystem based on the cumulative damage.

7. The system of claim 1, wherein the one or more controllers are configured to calculate a rainflow cycle count matrix to determine a level of fatigue or stress exhibited by the propulsion subsystem based on a throttle of the vehicle, and the one or more controllers are configured to determine the cumulative damage based on the rainflow cycle count matrix.

8. The system of claim 1, wherein the one or more controllers are configured to determine a non-zero threshold based on a rainflow cycle count matrix, and the one or more controllers are configured to determine the end of life based on the non-zero threshold.

9. The system of claim 1, wherein the one or more controllers are configured to adjust at least one of a throttle, a brake, or a schedule of a trip plan of the propulsion subsystem to reduce damage of the component of the cumulative damage.

10. The system of claim 1, wherein the one or more controllers are configured to determine the end of life based on a morphology of the parameter and another parameter that is detected by the sensor or another sensor.

11. The system of claim 1, wherein the sensor is configured to acquire at least one of a rotor speed, a pressure, or a temperature of the propulsion subsystem as the parameter.

12. The system of claim 1, wherein the one or more controllers are configured to generate the new trip plan or modify the first trip plan based on a projected life of a component of the propulsion subsystem, the one or more controllers set a non-zero threshold based on the projected life of the component, wherein the projected life represents an amount of operable life of the component prior to the end of life.

13. The system of claim 1, wherein the one or more controllers are configured to calculate predicted cumulative damages of the component of the propulsion subsystem based on successive trip plans of the vehicle, the one or more controllers configured to determine different failure trajectories of the component to identify the end of life of the component based on the failure trajectories to determine the end of life.

14. The system of claim 1, wherein the one or more controllers are configured to generate an alert on a display when the end of life is reached.

15. The system of claim 14, wherein the alert is at least one of a visual or an audible alert, and the alert automatically schedules maintenance for the component.

16. A method comprising:
receiving from one or more sensors parameters measured from a propulsion subsystem of a vehicle, the propulsion subsystem including an oil filter;
calculating a cumulative damage of a component of the propulsion subsystem based on the parameters;
generating a first trip plan, wherein the first trip plan includes control settings to automatically control the vehicle during a trip plan;
determining an end of life of the component relative to the cumulative damage;
generating a new trip plan for controlling the vehicle during the trip plan or modifying the first trip plan into a modified trip plan responsive to and based on at least one of the cumulative damage or the end of life;
identifying an amount of time between a shut down to reduce oil from passing through oil filter; and
using the amount of time to determine at least one of a clean oil filter, a mass on the oil filter, or damage to the oil filter.

17. The method of claim 16, further comprising, adjusting one or more throttle settings that are designated in the first trip plan for controlling the vehicle during a trip plan, based on the cumulative damage of the component.

18. The method of claim 16, further comprising calculating a predicted cumulative damage of the component of the propulsion subsystem based on successive trip plans of the vehicle; and
determining different trajectories of the component to identify an end of life of the component based on a probability of failure representing the end of life, wherein the end of life represents an amount of operable life of the component prior to the end of life.

19. A system comprising:
a sensor configured to detect a parameter of a propulsion subsystem of a vehicle; and
one or more controllers,
wherein at least one of the one or more controllers is configured to generate a first trip plan and to automatically control the vehicle according to the first trip plan;
wherein at least one of the one or more controllers is operatively connected to the sensor and configured to receive the parameter of the propulsion subsystem, calculate a cumulative damage of a component of the propulsion subsystem based on the parameter, and determine an end of life of the component relative to the cumulative damage;
wherein at least one of the one or more controllers is configured to generate a new trip plan or modify the first trip plan into a modified trip plan based on at least one of the cumulative damage or the end of life, where the new trip plan or the modified trip plan is configured, during operation of the vehicle according to the new trip plan or the modified trip plan, for at least one of an adjustment in velocity or avoiding one or more operating conditions of the vehicle, relative to the first trip plan, which results in less wear or use of the component relative to operation of the vehicle according to the first trip plan;

wherein the one or more controllers are configured to calculate predicted cumulative damages of the component of the propulsion subsystem based on successive trip plans of the vehicle, the one or more controllers configured to determine different failure trajectories of the component to identify the end of life of the component based on the failure trajectories to determine the end of life.

20. The system of claim 19, wherein the propulsion subsystem includes an oil filter, the one or more controllers configured to identify an amount of time between a shut down to reduce oil from passing through oil filter; and wherein the one or more controllers are configured to use the amount of time to determine at least one of a clean oil filter, a mass on the oil filter, or damage to the oil filter.

* * * * *